Patented Dec. 8, 1953

2,662,026

UNITED STATES PATENT OFFICE 2,662,026

STABILIZED LACTIC CASEIN SOLUTION

Karl B. Daniloff, Seattle, Wash., assignor to Monsanto Chemical Company, St. Louis, Mo., a corporation of Delaware No Drawing. Application April 16, 1949,
Serial No. 88,030

9 Claims. (Cl. 106—143)

The present invention relates to stable solutions of lactic or self-soured casein, such solutions being particularly desirable for making various aqueous adhesives and glues, for use as a protective colloid in emulsions and as a combined protective colloid and binder in aqueous emulsion paints.

An object of the invention is to produce solutions of lactic acid casein which are stable against decomposition or deterioration for extended periods of time, which have such a high stability that even moderately alkaline solutions are not subject to alkaline or other hydrolysis, which neither putrefy nor develop mold growths, and which have the property of not deteriorating on long shelf storage in a warm climate. Another object is to produce low viscosity stable solutions of this character. Another object is to produce solutions of high concentration and relatively low viscosity, such for instance that a solution containing 30% casein solids will not have a viscosity exceeding about 5000 centipoises. Another object is to produce a solution having a pH as high as 8.5 and a heat stability such that two weeks' exposure at 150° F. will produce no evidence of hydrolysis or other deterioration. Other objects and advantages of the invention will be pointed out in the subsequent disclosure.

Lactic acid casein due to availability and general good properties has been a convenient and desirable material for making the various types of casein solutions previously mentioned. However, its use has presented a very serious problem wherever long term stability is essential. Deterioration and decomposition have been due to a variety of causes including hydrolysis which is especially troublesome in alkaline solutions, putrefaction due to bacterial action, and mold growth. Various protective measures have heretofore been attempted, such as lowering the pH of the solutions as far as practical and the addition of toxic preservatives to inhibit decomposition due to the life processes of low organisms. The use of certain specific dispersing or solubilizing agents, such as borax and buffered mixtures of borax and boric acid, has been attempted both as a means of obtaining satisfactory dispersions at low pH values which tend to avoid alkaline hydrolysis and also because the borax-boric acid combination has some direct preservative value to inhibit part of the decomposition which appears to be due to the presence of low organisms.

With the non-lactic acid type of caseins, such as acid-precipitated caseins, these measures have produced solutions of fairly satisfactory stability. However, in the case of lactic casein solutions, the stability has not hitherto been at all satisfactory and great losses have been incurred due to paints and similar articles becoming useless or even offensively putrefied during shelf storage.

It has now been discovered that solutions of lactic casein of dependable, long term stability can readily and economically be produced by the method of the present invention. The successful solution of this problem has now been attained by a combination of three essential features, namely: treatment, preferably heat treatment, to free the casein from active proteolytic enzymes, mildly alkaline dispersion with added boric acid to buffer the solution to a final pH value not exceeding about pH 8.5, and the addition of a bacteria and mold growth toxicant to inhibit the growth of low organisms. Specifically, heat treatment of the casein for thirty minutes at 170° F. inhibits the enzymes hydrolysis, dispersing with 20% of borax with 5% of added boric acid produces a mildly alkaline solution with a pH of 8.3, and the addition of 3% sodium 2-chlor-o-phenylphenate with 1% of the sodium salt of pentachlorphenol inhibits all growth of low organisms. The combined effect is to produce a solution of long term stability, low viscosity, and excellent adhesive power.

The following examples illustrate the invention but should not be construed in a limiting sense since numerous variations will be apparent to those skilled in the art.

*Example I.—(10% solution)*

Materials (parts by weight):

| | |
|---|---|
| Lactic casein | 10.0 |
| Sodium 2-chlor-o-phenylphenate | 0.3 |
| Pentachlorphenol (sodium salt) | 0.1 |
| Borax | 2.0 |
| Boric acid | 0.5 |
| Water | 87.1 |
| | 100.0 |

MIXING DIRECTIONS

The casein is soaked for thirty minutes in water to which the two chlorphenols have been added. Heat is then applied and the mass agitated while the temperature rises to about 170° F. The borax is than added and the temperature held at 170° F. with agitation for fifteen minutes and the boric acid is then added. Heating at 170° F. and agitation is continued for another fifteen minutes. The smooth dispersion thus formed is then cooled to room temperature and any evaporation losses made up. The resulting solution will have a pH of about 8.3 and will be stable for at least six months under all normal conditions of storage including storage in a hot climate without any sign of change in adhesive value, viscosity, or odor.

Attention is particularly directed to the heating at 170° F. for a total of thirty minutes in the foregoing example. The heating is an essential feature of the present invention and it is preferred to continue the heating for about thirty minutes at about 170° F. However, it has been ascertained that the heating period may be shortened to a total of ten minutes and also produce a solution having a long term stability.

*Example II.—(30% solution)*

Materials:

| | |
|---|---:|
| Lactic casein | 30.00 |
| Sodium 2-chlor-p-phenylphenate | 0.90 |
| Pentachorphenol (sodium salt) | 0.30 |
| Borax | 9.00 |
| Boric acid | 1.00 |
| Water | 58.00 |
| | 100.00 |

The mixing directions are the same as for Example I. This solution will have a viscosity of about 4500 centipoises, making it readily pourable after warming for use in making various industrial preparations. Its stability proved to be excellent on an accelerated test consisting in storing the material in a heated cabinet for two weeks at 150° F. Upon cooling to room temperature at the end of the test, no change could be detected in adhesive value, viscosity, or odor.

*Example III.—(Pigmented emulsion paste paint)*

Materials:

| | |
|---|---:|
| Solution from Example I | 37.7 |
| Drying oil | 4.3 |
| Ammonia soap | 2.0 |
| Pigments | 9.6 |
| Fillers | 46.4 |
| | 100.0 |

MIXING DIRECTIONS

These materials are stirred together and then intimately mixed by being ground in a paint mill until smooth. The resulting paste paint concentrate has long term shelf storage life and can be diluted with water for application. Other proportions of casein solution may be used in the range between about 20 and 60 parts with small amounts of drying oil and ammonia soap and mineral pigments and fillers in amount to produce a pasty emulsion which can be readily diluted with water by the user to paint consistency.

The heating step in connection with the foregoing examples is an important feature. After a great deal of experiment, it is believed that the principal reason why lactic caseins, as compared to acid-precipitated caseins, have troublesome instability is because the lactic casein contains powerful proteolytic enzymes which are either not present in the acid-precipitated caseins or are destroyed by the acid treatment or processing. For instance, if three alkaline casein solutions of about 10% concentration are made up, in the one case with lactic casein which is merely warmed to promote solution, in the second case with lactic casein with thirty minutes' heat treatment at 170° F. as described in Example I, and in the third case with acid-precipitated casein made up with the same alkali and merely warmed to promote solution—upon cooling to room temperature, the three solutions will have a syrupy character and considerable viscosity. If then, the three solutions are allowed to stand at room temperature for about forty-eight hours, none of them in that period will develop bad odor or mold growth but the one made by merely warming the lactic casein solution will become as thin as water while the other two solutions will remain at approximately their original viscosity. This behavior strongly suggests the presence in the lactic casein of powerful proteolytic enzymes which rapidly break down the casein molecule to small residues which have no viscosity or adhesive power. It appears probable that the stability of the solution of lactic casein which was strongly heated is due to the fact that the heating has destroyed a content of proteolytic enzymes. The fact that the acid-precipitated casein does not thin on standing of course suggests that it is free from the objectionable enzymes present in the lactic product. That such objectionable enzymes should be present in lactic casein seems reasonable in view of the fact that such caseins are self-soured and are often made under rather poor sanitary conditions and are hence more likely to carry along into the final dried casein enzymes originally present in the milk which would be more likely to be removed or destroyed by the more drastic acid-precipitation and processing and generally better methods of obtaining a pure casein which are used in the acid casein processes. At any rate, it appears that the heat treatment of the present invention is an essential step in obtaining the desired high degree of stability with the lactic type of casein.

In these examples, the use of the combination of borax and boric acid as the dispersing agents probably also is helpful from the stability standpoint as these agents have mild antiseptic properties. However, the use of the heat treatment and the borax-boric acid dispersion has not been found sufficient to protect lactic casein solutions against ultimate decomposition and particularly mold growth. The use of a sufficient amount of toxic preservatives prevents both bacterial decomposition and mold growth but without the heat treatment step is ineffective to produce lactic casein solutions of long term stability. It has been ascertained that the combination of the three features of the present invention, namely: heat treatment, mild dispersing agents . . . preferably borax-boric acid dispersion, and the toxic preservatives, is necessary to produce full, long term stability.

In regard to the preservatives: the combination of from about 1% to 5% sodium 2-chlor-o-phenylphenate and from about 0.25% to 1% of the sodium salt of pentachlorphenol in proportion to the casein is preferred because it seems to be the most effective and economical combination, perhaps due to synergistic action between the two phenolic materials. However, other preservatives, such as carbinyl-p-oxybenzoate, tertiary butyl derivatives of cresol, p-chlorometacresol, 2-p-cymenol, and p-hydroxybenzoic acid, which are well known in the art may be substituted provided a sufficient concentration is used to inhibit both the growth of bacteria and molds. Slightly reduced amounts of these two chemicals in approximately the same proportions are also effective but may not provide sufficient margin of safety under adverse conditions and increased amounts can be used but apparently are unnecessary.

In regard to the pH value of these solutions: stable solutions may readily be made having a final pH range between about 6.75 and 8.5. The dispersing agent should produce only a mild alkalinity not exceeding about pH 8.5 and the use of boric acid is effective to buffer the pH to a lower value. For instance, the borax in Example I can be reduced from two parts to one and the boric acid increased from 0.5 part to one and a satisfactory solution obtained having a low pH of about 6.75.

It has also been found possible to dry the solution described in Example I or similar solutions of moderate concentration and viscosity and produce a stable dry casein which is readily soluble in cold water and then reconstitute the parent solution and have the same good properties of great stability and long storage life. The dry product may readily be made by well known methods employing either a drum dryer to produce a flake product which can be ground to a powder as desired or, by using a spray dryer, a powdered product is produced directly.

In the place of the borax, other alkaline casein solvents such as caustic alkali, alkali metal salts, and ammonia may be substituted provided they are used in minimum amount as mild dispersing agents to disperse the casein and not exceed a pH value of about 8.5 in the final solution. The conjoint use of boric acid is recommended both to lower the pH and to add antiseptic properties.

In regard to the proportions of ingredients: borax may be used in the range of between about 10% and 40% in proportion to the casein. Boric acid may be used in the range between about 2.5% to 10% of the casein component. It is not believed to be essential that the boric acid be present during a portion of the heating stage. However, since boric acid is rather slow to dissolve, it is convenient to add it during the heating or while the mixture is still warm which also adds greatly to the solubility and results in almost instantaneous solution.

In regard to the range of heat treatment required to permanently inactivate the lactic acid casein enzymes: a treatment in the range from about ten minutes at 170° F. to about thirty minutes at 150° F. has been found effective. However, to be sure of very long term stability, the recommended treatment of thirty minutes at 170° F. is preferred since this adds little to the cost of making the solutions and apparently provides a wide margin of safety and long term shelf storage under adverse conditions.

In regard to the choice of toxic agents: it is simply necessary to use any of the well known agents, particularly the phenolics and other compounds previously mentioned and organic mercurials such as mercury oleates and phosphates which have been described in the literature and are effective to inhibit both bacterial action and mold growth. The recommended combination of about 3% sodium 2-chlor-o-phenylphenate and 1% sodium pentachlorphenate has been found particularly effective and economical. It is also possible, although usually not economical, to first deactivate the lactic acid casein enzymes before dispersing the casein with alkali and then proceed with the mild dispersion together with the addition of boric acid and toxicants as described in Example I. Equivalent preliminary heat treatment of the casein in aqueous suspension is effective. Also, treatment with ethyl alcohol without heat treatment followed by removal of the alcohol produces a lactic casein which is free from the troublesome enzyme hydrolysis tendency. However, these methods provide no manufacturing advantage and, if not carefully carried out, would be likely to fail to provide the full margin of safety as to stability which is readily obtained by the method described in Example I.

I claim:

1. A stable lactic casein solution comprising lactic casein which has been freed from active proteolytic enzymes by heat treatment in the range of about 30 minutes at about 150° F. and about 10 to 30 minutes at about 170° F., water to produce approximately a 10% to 30% by weight lactic casein solution, and, for each 100 parts by weight of lactic casein, between about 10 and 40 parts by weight of borax, between about 2.5 and 10 parts by weight of boric acid, between about 1 and 5 parts by weight of a sodium salt of a mono-chlor-phenylphenol and between about 0.25 and 1 part by weight of sodium pentachlorphenate.

2. A stable dry water-soluble lactic casein product comprising the product of drying the solution described in claim 1.

3. A stable pigmented emulsion paste paint made by intimately mixing a mixture comprising between about 20 and 60 parts by weight of a stable lactic casein solution as described in claim 1 together with approximately 4.3 parts by weight of a drying oil, approximately 2.0 parts by weight of an ammonia soap, approximately 9.6 parts by weight of a mineral pigment and approximately 46.4 parts by weight of a mineral filler.

4. A stable aqueous solution of lactic casein containing approximately 30% by weight lactic casein, approximately 9% by weight borax, approximately 1% by weight boric acid, approximately 0.9% by weight sodium 2-chloro-p-phenylphenate, approximately 0.3% by weight sodium pentachlorophenate, and approximately 58.8% by weight water, said lactic casein being freed of active proteolytic enzymes by heat treatment in the range of about 30 minutes at 150° F. and about 10 to 30 minutes at about 170° F.

5. The method of making a stable solution of lactic casein which comprises the steps of heating the lactic casein in the presence of water until the active proteolytic enzyme constituents are irreversibly inactivated, adding borax in an amount sufficient for dispersing the lactic casein and sufficient boric acid to buffer the solution to a pH between about 6.75 and 8.5, and incorporating a mixture of sodium pentachlorophenate and the sodium salt of a mono-chlor-phenylphenol in an amount sufficient to inhibit bacteria and mold growth.

6. The method of making a stable solution of lactic casein which comprises the steps of heating the lactic casein in the presence of water in the range of about 30 minutes at about 150° F. and about 10 to 30 minutes at about 170° F., dispersing the casein with borax, buffering the solution to a pH between about 6.75 and 8.5 with boric acid, and incorporating in the solution per 100 parts by weight lactic casein between about 1 to 5 parts by weight of a sodium salt of a mono-chlor-phenylphenol and between about 0.25 to 1 part by weight of sodium pentachlorophenate.

7. The method of claim 6 in which the heating is conducted for about 30 minutes at about 170° F.

8. The method of making a stable solution of lactic casein which comprises admixing 100 parts by weight lactic casein, about 1 to 5 parts by weight of a sodium salt of a mono-chlorphenylphenol and between about 0.25 to 1 part by weight of sodium pentachlorophenate in water, heating the mix so obtained in the range of about 30 minutes at about 150° F. and about 10 to 30 minutes at about 170° F., dispersing the casein with borax, and buffering the solution to a pH between about 6.75 and 8.5 with boric acid.

9. A stable aqueous lactic casein solution consisting essentially of lactic casein which has been freed from active proteolytic enzymes by heat treatment in the presence of water in the range of about 30 minutes at about 150° F. and about 10 to 30 minutes at about 170° F., and borax in an amount sufficient for dispersing said lactic casein, boric acid, and a toxicant mixture consisting of sodium pentachlorophenate and a sodium salt of a mono-chlor-phenylphenol, said toxicant mixture being present in an amount sufficient to inhibit bacteria and mold growth, said solution having a pH between about 6.75 and 8.5.

KARL B. DANILOFF.

References Cited in the file of this patent

UNITED STATES PATENTS

| Number | Name | Date |
|---|---|---|
| 790,821 | Dunham | May 23, 1905 |
| 2,095,887 | Nicol | Oct. 12, 1937 |
| 2,154,401 | Iddings | Apr. 11, 1939 |
| 2,200,353 | Alig | May 14, 1940 |
| 2,246,983 | Oberg | June 24, 1941 |
| 2,280,546 | Schuler | Apr. 21, 1942 |
| 2,297,125 | Atwood | Sept. 29, 1942 |
| 2,516,700 | Holloway et al. | July 25, 1950 |